(12) United States Patent
Natrajan et al.

(10) Patent No.: US 9,348,513 B2
(45) Date of Patent: May 24, 2016

(54) SAS VIRTUAL TAPE DRIVE

(75) Inventors: Balaji Natrajan, Spring, TX (US); Michael G Myrah, Cypress, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 470 days.

(21) Appl. No.: 13/192,010

(22) Filed: Jul. 27, 2011

(65) Prior Publication Data

US 2013/0031570 A1    Jan. 31, 2013

(51) Int. Cl.
*G06F 9/54* (2006.01)
*G06F 3/06* (2006.01)

(52) U.S. Cl.
CPC ............ *G06F 3/0605* (2013.01); *G06F 3/0664* (2013.01); *G06F 3/0683* (2013.01)

(58) Field of Classification Search
CPC .... G06F 3/0605; G06F 3/0664; G06F 3/0683
See application file for complete search history.

(56) References Cited

U.S. PATENT DOCUMENTS

| | | |
|---|---|---|
| 6,070,224 A | 5/2000 | LeCrone et al. |
| 6,260,110 B1 | 7/2001 | LeCrone et al. |
| 6,341,329 B1 | 1/2002 | LeCrone et al. |
| 7,007,129 B2 | 2/2006 | Sekine et al. |
| 7,200,546 B1 | 4/2007 | Nourmohamadian et al. |
| 7,359,848 B1 * | 4/2008 | Nourmohamadian et al. . 703/24 |
| 7,437,462 B2 | 10/2008 | Marks et al. |
| 7,747,816 B1 * | 6/2010 | Nourmohamadian et al. ............... 711/111 |
| 2003/0046461 A1 | 3/2003 | Sivertsen |
| 2005/0033911 A1 * | 2/2005 | Kitamura et al. ............. 711/111 |
| 2005/0125189 A1 | 6/2005 | Clegg et al. |
| 2006/0047905 A1 | 3/2006 | Matze et al. |
| 2007/0165660 A1 | 7/2007 | Fang et al. |
| 2007/0192561 A1 | 8/2007 | Satoyama et al. |
| 2007/0255900 A1 | 11/2007 | Lee et al. |
| 2008/0177871 A1 | 7/2008 | Howard et al. |
| 2008/0301363 A1 | 12/2008 | Kitamura et al. |
| 2009/0083423 A1 * | 3/2009 | Basham et al. ............... 709/226 |
| 2009/0157958 A1 | 6/2009 | Maroney et al. |
| 2010/0049919 A1 | 2/2010 | Winokur et al. |
| 2010/0100676 A1 * | 4/2010 | Johnson et al. ............... 711/114 |
| 2011/0191637 A1 * | 8/2011 | Wight et al. .................... 714/43 |

OTHER PUBLICATIONS

Heng Liao, Managing access control through SAS Zoning, Nov. 20, 2008 pp. 1-8.*
McKinstry, What is a Virtual Tape Library, Jun. 16, 2006, pp. 1-4.*

* cited by examiner

*Primary Examiner* — Syed Roni
(74) *Attorney, Agent, or Firm* — Hewlett Packard Enterprise Patent Department

(57) ABSTRACT

A serial attached small computer system interface (SAS) expander for providing a virtual tape drive. The expander includes a virtual tape manager to generate a virtual tape virtual PHY capable of being part of a zone group wherein the virtual tape virtual PHY comprises drive bays which support disk drives for emulation of tape drives.

23 Claims, 3 Drawing Sheets

SAS VIRTUAL TAPE DRIVE

BACKGROUND

Direct-attached storage (DAS) refers to a data storage system that is directly attached to a server or workstation. The data capacity and connectivity of the DAS system may be improved through the use of switches or expanders, which enable a large bank of DAS devices to be coupled to Multiple servers. A common communications protocol for enabling communications between the servers and the storage drives is the serial attached small computer system interface (SAS). SAS devices such as storage controllers, storage drives, and expanders communicate with each other using the SAS protocol. Storage drives can include tape drives which can provide sequential access storage and disk drives which can provide random access storage. The interconnection network between the SAS devices may be referred to as a fabric. The storage resources of the DAS devices are made accessible to servers by configuring zone groups, which control how the expanders route connections through the switch to couple specific servers to specific storage drive bays.

BRIEF DESCRIPTION OF THE DRAWINGS

Certain exemplary embodiments are described in the following detailed description and in reference to the drawings, in which.

DETAILED DESCRIPTION OF SPECIFIC EMBODIMENTS

Figure 1:
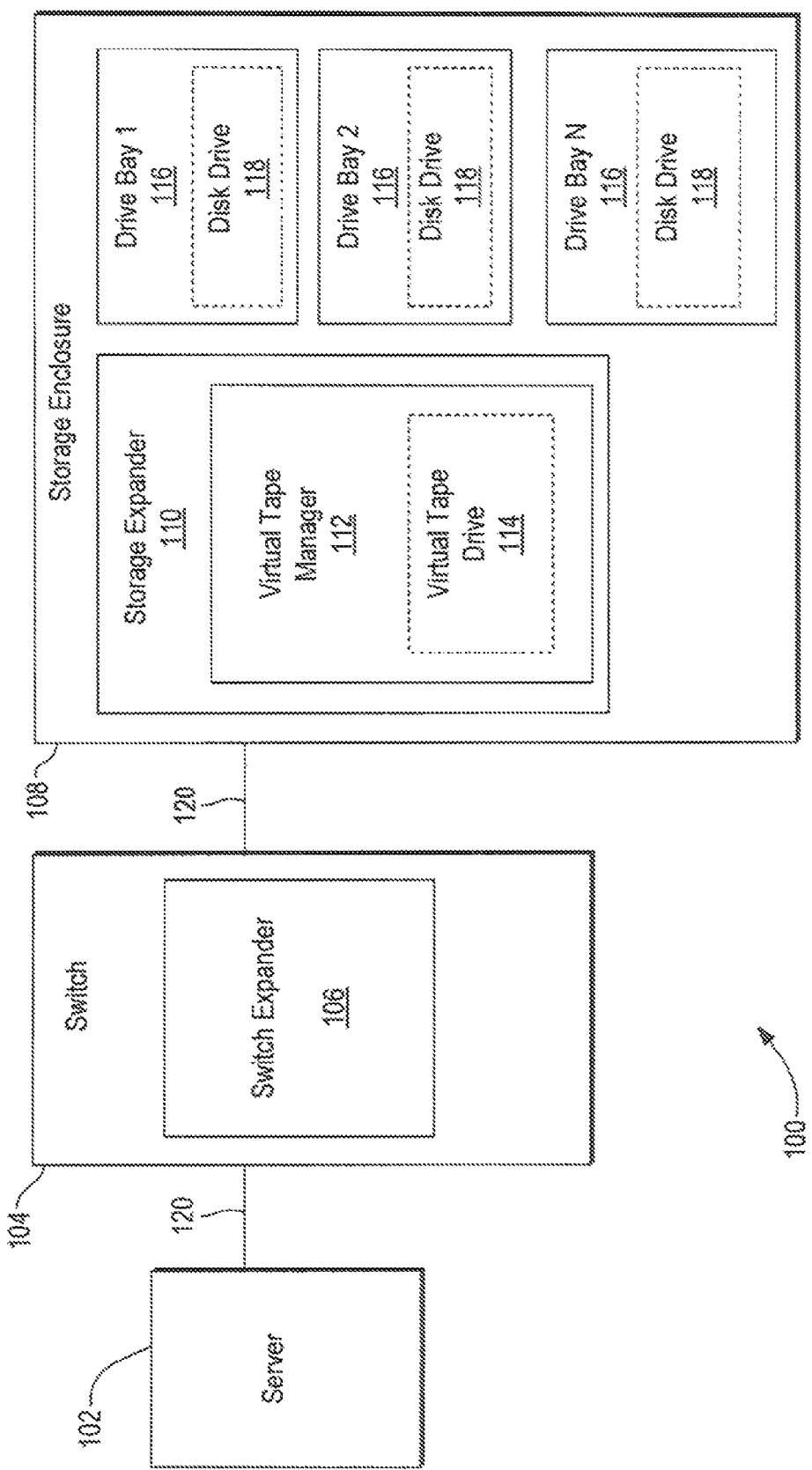
FIG. 1 is a block diagram of a data storage system in accordance with embodiments.

Disclosed are embodiments of techniques which may provide a virtual tape drive for a direct attached storage (DAS) system. More specifically, embodiments of the present techniques may provide a virtual tape drive which emulates a tape drive based on a disk drive for use in a serial attached small computer system interface (SAS) fabric. In one embodiment, disclosed is a SAS expander for providing a virtual tape drive, the expander includes a virtual tape manager to generate a virtual tape virtual PHY capable of being part of a zone group wherein the virtual tape virtual PHY comprises drive bays which support disk drives for emulation of tape drives. The virtual tape manager may include a translation layer which can receive sequential access commands for a tape drive and convert those commands to random access commands for a disk drive. In one example, the virtual tape manager can be part of a storage enclosure which comprises disk bays for supporting storage resources such as disk drives. The storage enclosure can be part of a data storage system and can be coupled to a server through a switch.

An Initiator is a SAS device that originates device-service and task-management requests for processing by a target device and receives responses for the same requests from other target devices. A target is a SAS device which can comprise logical units and target ports that can receive device service and task management requests for processing and sends responses for the same requests to initiator devices. A target device can be a disk drive or a disk array system. An expander is a SAS device that may form part of a service delivery subsystem and facilitate communication between SAS devices. In one example, a system can include a server (initiator) coupled to a storage resource such as a storage enclosure with drive bays (target) through a switch (expander). Such a system can comprise SAS devices and can be configured as part of a SAS fabric and communicate with each other using the SAS protocol. PHY is a physical layer concept that exists on SAS devices. A physical PHY can represent a physical device whereas a virtualized PHY (also referred to herein as a "virtual PHY") can represent a virtual device which is being emulated from a physical device. A zone group is a SAS feature to allow devices attached to PHYS to communicate with each other.

In one example, a storage system which is capable of being zoned can include a server coupled to a storage enclosure through a switch. The user can define zone groups by specifying storage enclosure drive bays and then assign those zone groups to the server. The switch may include a user interface such as a graphical user interface (GUI) or command line interface (CLI) interface that can allow the user to generate the zone group. The present techniques allow a user to specify whether a zone group includes a standard disk drive zone group or a virtual tape zone group that emulates a tape drive directly from disk drives on a storage enclosure. The present techniques may allow the storage enclosure to emulate the virtual tape by generating a virtual tape virtual PHY for the disk drive in the zone group that needs to be emulated as a tape and then zone out the disk drive that will be used to represent the tape drive. The present techniques may allow storage access commands from the server to be sent to the virtual tape virtual PHY which can translate the commands and then send the commands to the disk drive for processing.

The present techniques may provide for a virtual tape library of virtual tape drives based on emulation of a tape drives using disk drives in a SAS fabric. This may reduce the need to use and support a emulation application and driver that translates tape sequential access commands to disk random access commands. The virtual tape drive of the present techniques may permit a user to continue to use existing backup applications and specify a high performance virtual tape drive library as a primary library and a physical tape drive library as a secondary library. This may allow easier implementation of tiered storage from an operating system (OS) layer. These techniques may provide a SAS solution to emulate a tape drive library directly from a storage enclosure and allow a user to assign a zone group for disk drives and zone group for virtual tape drives from a SAS switch.

FIG. 1 is a block diagram of a data storage system in accordance with embodiments. The system 100 includes a server 102 operatively coupled to a storage enclosure 108 through a switch 104. The storage enclosure 108 includes drive bays 116 which can support storage resources such as storage drives which can include disk drives 118, solid state drives, and the like. Although system 100 shows a single server 102 coupled to a single storage enclosure 108 through a single switch 104, it should be understood that the present techniques can apply to a plurality of servers, storage enclosures and switches coupled to each other. The server 102 may be an initiator device, storage enclosure 108 and drive bays 116 may be target devices, and switch 104 may be an expander device. The server 102, switch 104 and storage enclosure 108 may use the SAS protocol for connecting and transferring data and system 100 may be referred to as SAS fabric. In one embodiment, the SAS protocol can include SAS 2.0. In embodiments, server 102, switch 104 and storage enclosure 108 may be installed in a blade enclosure. For example, the blade enclosure may include one or more blade bays for receiving server 102, switch 104 and drive bays 116 of storage enclosure 108.

The server 102 can be any electronic device capable of processing data. The server 102 can include a storage controller (not shown) such as disk array controller which can manage physical disk drives and can present them to the server as logical units. In some examples, the storage controller can implement redundant array of independent disks (RAID) functionality and may be referred to as a RAID controller. The server 102 may include an application program that can communicate with switch 104 and storage enclosure 108. For example, server 102 can include a backup application program which can communicate random access storage commands (e.g., read and write) to storage enclosure 108 to have disk drives 118 backup data. The backup application can include functionality to communicate sequential access storage commands (e.g., read and write) to storage enclosure 108 to have virtual tape drive 114 backup data. As explained below, storage enclosure 108 may provide virtual tape drive 114 by emulating a tape drive based on disk drives 118 associated with storage enclosure 108.

The switch 104 may be configured to couple server 102 to storage enclosure 108 and drive bays 116 of the storage enclosure. The switch 104 includes a switch expander 106 that can control the routing between server 102 and storage enclosure 108. The switch expander 106 may be coupled to server 102 and storage enclosure 108 through physical interconnections 120, which may be cables or hardwired interconnections included in a storage or blade enclosure, for example. The two ends of a physical interconnection 120 are referred to herein as ports. The switch expander 106 may include a plurality of ports referred to herein as expander ports. Expander ports may be coupled to server ports and drive ports through physical interconnections 120.

The switch expander 106 may be operatively coupled to a storage administration device through a TCP/IP network connection, for example. The storage administration device may be, for example, a general purpose computer that enables an administrator to control and configure operation of switch 104 remotely. In some embodiments, the administration device can provide a user interface to allow a user to control and configure operation of switch 104. For example, the user interface can include a CLI, GUI or other means of exchanging information with switch expander 106. In one example, the user interface can provide a user with a view of storage enclosure 108 and drive bays 116 which may be available to be assigned to zone groups. The user interface can allow a user to specify which drive bays 116 are to support disk drives 118 for emulating a tape drive. The user interface can allow a user to generate a command to instruct storage expander 110 to generate a virtual tape virtual PHY for each drive bay that will be used to emulate tape drives. The command may include a list of physical PHYS associated with storage enclosure 108 that will be designated as virtual tape virtual PHYS.

As explained above, system 100 can implement a SAS fabric and configured to communicate using a SAS protocol. The server 102, which can be an initiator in a SAS fabric, can discover or detect other devices such as expanders connected to the fabric using a SAS discovery process. For example, during the discovery process, server 102 can send a SMP REPORT GENERAL command to switch expander 106 requesting the number of PHYS connected to the expander. The switch expander 106 can respond with a particular number of physical PHYS and virtual PHYS. The server 102 can then send SMP DISCOVER or DISCOVER LIST commands to the physical PHY requesting for information about the physical PHY such as physical devices connected to the physical PHY. In addition, server 102 can send DISCOVER or DISCOVER LIST commands to the virtual PHY requesting for information about the virtual PHY. A physical PHY can represent a physical device whereas a virtual PHY can appear to server 102 as a physical device but can be a virtual device which is being emulated by the expander.

The storage enclosure 108 includes a virtual tape manager 112 which can communicate with storage expander 110. The storage expander 110 may be configured to control routing between switch 104 and drive bays 116. The virtual tape manager 112 may be configured to provide virtual tape drive 114 for use by server 102 or other initiator. Although one virtual tape drive 114 is shown, it is understood that a plurality of virtual tape drives can be provided which can form a virtual tape library. As explained below in further detail, virtual tape manager 112 can generate a virtual tape virtual PHY capable of being part of a zone group. The virtual tape virtual PHY can comprise drive bays 116 associated with disk drives 118 for emulation of tape drives.

The virtual tape manager 112 is shown as being associated with storage enclosure 108. However, virtual tape manager 112 may be operatively coupled to a storage administration device through a TCP/IP network connection, for example. The storage administration device may be, for example, a general purpose computer that enables an administrator to configure storage enclosure 108 remotely. In some embodiments, the administration device can provide a user interface to allow a user to configure and control operation of storage enclosure such as assigning disk drives 118 to drive bays 116 and providing virtual tape 114 for use by server 102, for example. The user interface can include a CLI, GUI or other means of exchanging information with virtual tape manager 112 and storage enclosure. The virtual tape manager 112 may include a tape-to-disk translation layer which can receive sequential access commands intended a tape drive and convert those commands to random access commands intended for a disk drive.

Figure 2:
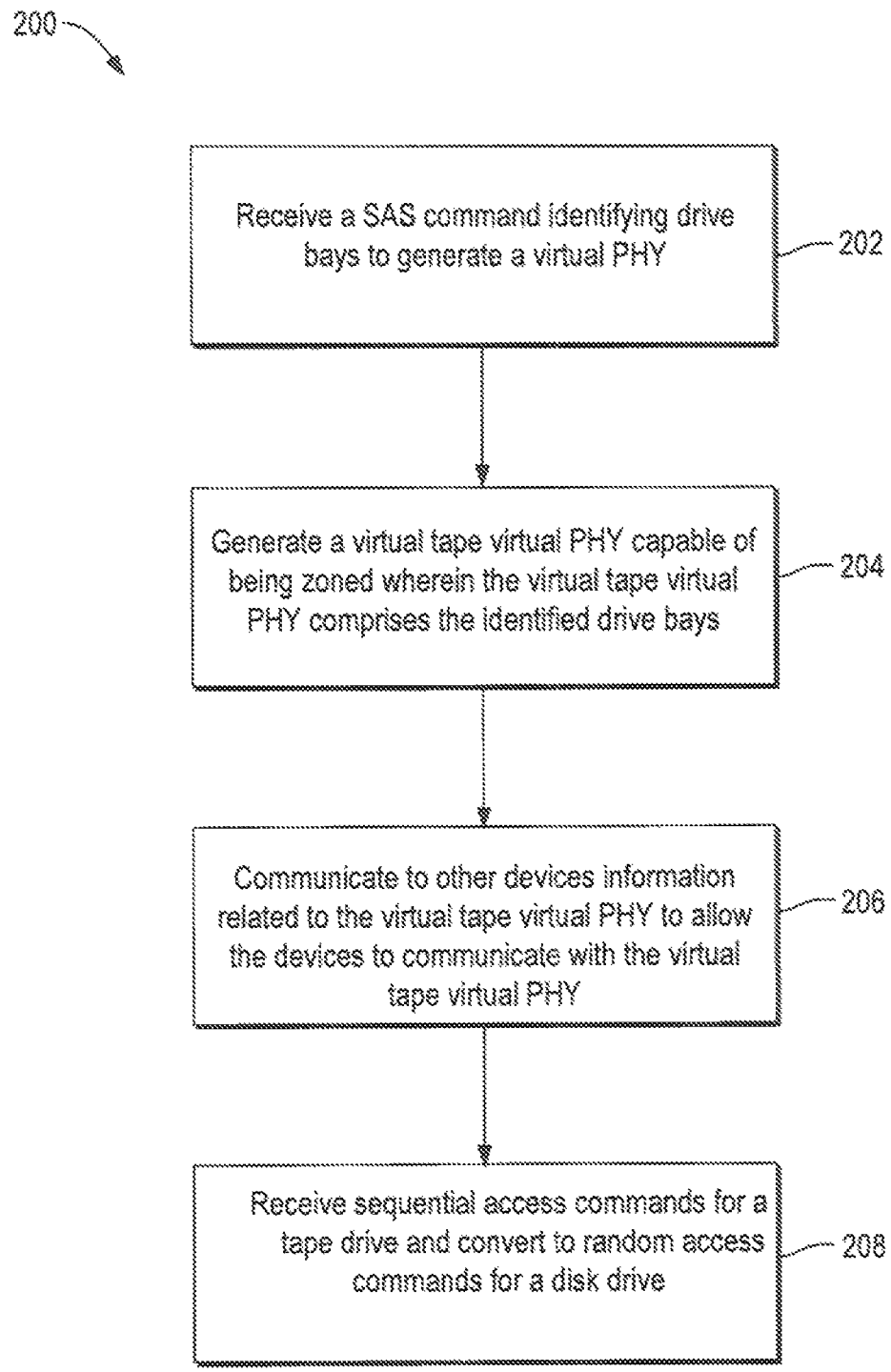
FIG. 2 is a process flow diagram of a method of providing a virtual tape drive in accordance with embodiments.

FIG. 2 is a process flow diagram of a method of operating virtual tape manager 112 in accordance with embodiments. The method 200 may be performed by system 100 including virtual tape manager 112 as shown in FIG. 1. As explained below, virtual tape manager 112 may provide a virtual tape drive 114 by emulating a tape drive based on disk drives 118 for use by server 102.

At block 202, virtual tape manager 112 receives a SAS command identifying drive bays 116 to be used to generate a virtual tape virtual PHY. For example, switch 104 may include a user interface which can provide a user with a view of storage enclosure 108 and drive bays 116 which may be available to be assigned to zone groups. The user interface can allow a user to specify which drive bays 116 to use support disks drives 118 which can be used for emulating tape drives. The user interface may permit a user to generate a command to instruct storage expander 110 to generate a virtual tape virtual PHY for each drive bay that will be used to emulate tape drives. The command may include a list of physical PHYS associated with storage enclosure 108 that will be designated as virtual tape virtual PHYS.

At block 204, virtual tape manager 112 generates a virtual tape virtual PHY capable of being part of a zone group wherein the virtual tape virtual PHY comprises the identified drive bays. For example, the virtual tape manager 112 can generate the virtual tape virtual PHY based on the drive bays identified by command sent from switch 104, at block 202 above. The virtual tape manager 112 can expose to system 100 virtual tape drive 114 as being attached to each virtual PHY. The virtual tape manager 112 can assign a unique SAS address to virtual tape drive 114 which can then be discovered as a physical device on system 100. As explained above, virtual tape manager 112 can include a translation layer which can receive from switch 104 or server 102 sequential access commands intended for a tape drive and convert them to random access commands applicable for disk drives 118. The virtual tape manager 112 can enable this functionality once it generates the virtual tape virtual PHY.

In one embodiment, virtual tape manager 112 can map virtual tape drive 114 to a physical drive bay 116 which can include a physical disk drive 118. The virtual tape manager 112 can configure virtual tape drive 114 to allow access to physical disk drive 118 for virtual tape functions but prevent other devices from accessing the disk drive for other purposes. This can be achieved by having virtual tape manager 112 set zone group "0" for the physical drive bay 116 associated with disk drive 118. In this manner, server 102 or other initiator can be prevented from accessing or targeting disk drive 118 associated with drive bay 116. That is, server 102 or other initiator may not have direct access to disk drive 118 but may only have access or communicate with virtual tape drive 114.

As explained above, a zone group is a SAS feature to control or grant access to allow PHYS to communicate with other PHYS. For example, a system can comprise a plurality of servers coupled to a storage enclosure with drive bays that include a plurality of disk drives. In one example, a first zone group can be used to assign one server to one group of disk drives and a second zone group can be used to assign another server to another group of disk drives. In this manner, zone groups can be used to assign storage resources to particular servers which can help prevent corruption or interference between servers and storage resources. As explained above, zone group "0" represents a special zone group such that a storage resource (e.g., disk drive) assigned to zone group "0" can prevent a server 102 or other initiator from accessing the storage resource. Furthermore, zone group "1" represents a special zone group such that a storage resource assigned to zone group "1" may allow server 102 or other initiator unlimited access to storage resources. Beside zone group "0" and zone group "1", a user can define other zone groups to control access to storage resources as necessary.

At block 206, virtual tape manager 112 communicates to other devices information related to the virtual tape virtual PHY to allow the devices to communicate with the virtual tape virtual PHY. For example, virtual tape manager 112 can generate a SAS BROADCAST (CHANGE) primitive. The BROADCAST (CHANGE) primitive can be used to communicate to devices on system 100 that a change has occurred on the system. The virtual tape manager 112 can forward this primitive to another expander such as switch expander 106 to allow the expander to perform discovery and update its configuration information such as route tables. The BROADCAST (CHANGE) will be propagated to server 102 or other initiator to allow the server to discover virtual tape drive 114 for future storage access including reading data from the virtual tape drive and writing to the virtual tape drive. The devices on system 100 can respond to this primitive by performing a SAS discovery process which can include sending SMP DISCOVER commands to other devices on the system. For example, switch 104 can respond by sending SAS discovery commands, such as serial management protocol (SMP) REPORT GENERAL, DISCOVER and SMP DISCOVER LIST, to virtual tape manager 112. The virtual tape manager 112 can respond by sending to switch 104 information about the newly added storage resource including virtual tape virtual PHY and corresponding virtual tape drive 114.

As explained above, switch 104 can include a user interface which can allow a user to assign a particular zone group to the virtual tape virtual PHY for user by server 102 or other initiator. The user interface can allow a user to assign a zone group for a particular virtual tape drive 114 and assign the zone group to a particular initiator such as server 102. As a result, devices on system 100 can respond by initiating generation of BROADCAST (CHANGE) primitives to devices on the system. In one example, server 102 can respond to the BROADCAST (CHANGE) primitive by performing SAS discovery procedures such as generating SAS discovery commands (SMP DISCOVER and SMP DISCOVER LIST) to discover the newly added virtual tape drive 114 and virtual tape virtual PHY on storage enclosure. Once server 102 discovers virtual tape drive 114 on storage enclosure 108, the server can communicate with the virtual tape device as described below in block 208.

At block 208, virtual tape manager 112 can receive sequential access commands intended for a tape drive and convert those commands to random access commands for intended for a disk drive. For example, as explained above, virtual tape manager 112 can include translation layer which can translate sequential access commands from server 102 or other initiator and translate them into random access commands for use by disk drive 118. In another example, server 102 can include a backup application program which can communicate random access storage commands (e.g., read and write) to storage enclosure 108 to have disk drives 118 backup data onto the disk drives. The backup application can include functionality to communicate sequential access storage commands (e.g., read and write) to storage enclosure 108 to have virtual tape drive 114 backup data. In this case, the translation layer can translate the sequential access commands into random access commands for use by disk drive 118 associated with virtual tape drive 114.

Figure 3:
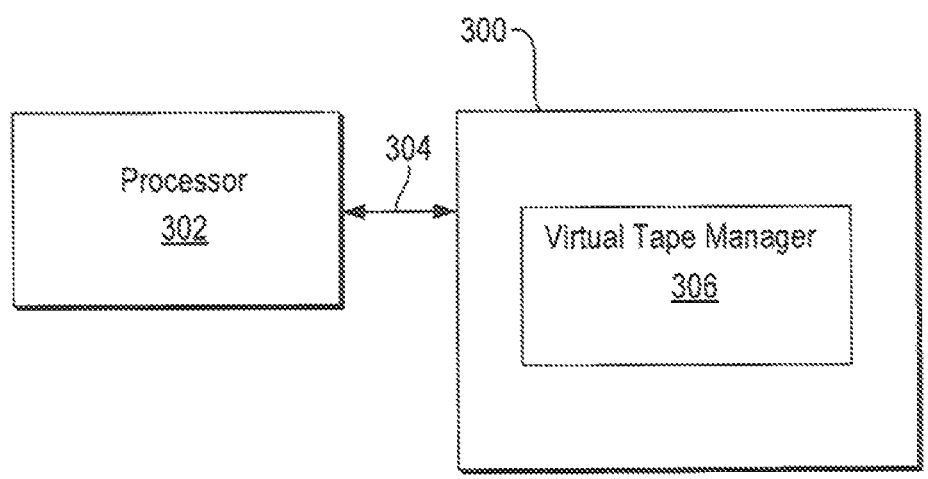
FIG. 3 is a block diagram showing a non-transitory, computer-readable medium that stores instructions for providing a virtual tape drive in accordance with embodiments.

FIG. 3 is a block diagram showing a non-transitory, computer-readable medium that stores code for operating a virtual tape manager in accordance with embodiments. The non-transitory, computer-readable medium is generally referred to by the reference number 30d and may be included in virtual tape manager 112 of system 100 described in relation to FIG. 1. The non-transitory, computer-readable medium 300 may correspond to any typical storage device that stores computer-implemented instructions, such as programming code or the like. For example, the non-transitory, computer-readable medium 300 may include one or more of a non-volatile memory, a volatile memory, and/or one or more storage devices. Examples of non-volatile memory include, but are not limited to, electrically erasable programmable read only memory (EEPROM) and read only memory (ROM). Examples of volatile memory include, but are not limited to, static random access memory (SRAM), and dynamic random access memory (DRAM). Examples of storage devices include, but are not limited to, hard disk drives, compact disc drives, digital versatile disc drives, optical drives, and flash memory devices.

A processor 302 generally retrieves and executes the instructions stored in the non-transitory, computer-readable medium 300 to operate the virtual tape manager 112 in accordance with embodiments. In an embodiment, the tangible, machine-readable medium 300 can be accessed by the processor 302 over a bus 304. A region 306 of the non-transitory, computer-readable medium 300 may include virtual tape manager 112 functionality as described herein.

Although shown as contiguous blocks, the software components can be stored in any order or configuration. For example, if the non-transitory, computer-readable medium 300 is a hard drive, the software components can be stored in non-contiguous, or even overlapping, sectors.

In the above description, the functionality of virtual tape manager 112 is described as being disposed on storage enclosure 108. However, it should be understood that the above techniques can be disposed on switch 104 or distributed between the switch and storage enclosure 108.

What is claimed is:

1. A serial attached small computer system interface (SAS) expander embodied at least in part in computer readable program code stored on a non-transitory computer readable media and executable by a processor, the expander comprising:
   a virtual tape manager to generate a virtual tape virtual PHY capable of being part of a zone group, wherein the virtual tape virtual PHY comprises physical drive bays that support disk drives for emulation of tape drives, the virtual tape manager configured to receive from another expander a command to identify which physical drive bays to select to generate the virtual tape virtual PHY; and
   wherein the virtual tape manager to define a particular zone group for a particular physical drive bay associated with a given disk drive of the disk drives to prevent an initiator from targeting the given disk drive associated with the particular physical drive bay so that the initiator does not have direct access to the given disk drive associated with the particular physical drive bay but has access to a virtual tape drive associated with the particular physical drive bay, the particular physical drive bay associated with the virtual tape virtual PHY, and the virtual tape manager to, in response to the defining of the particular zone group for the virtual tape drive and assignment of the particular zone group to the initiator, generate a BROADCAST primitive sent to the initiator to allow the initiator to discover the virtual tape drive.

2. The SAS expander of claim 1, wherein the virtual tape manager is configured to:
   receive from the initiator sequential access commands for a tape drive, and convert the sequential access commands for the tape drive to random access commands for a disk drive.

3. The SAS expander of claim 1, wherein the virtual tape manager is configured to generate a BROADCAST primitive sent to a second expander to allow update of routing tables of the second expander.

4. The SAS expander of claim 1, wherein the virtual tape manager is configured to communicate to another expander information relating to the generated virtual tape virtual PHY.

5. The SAS expander of claim 1, wherein the virtual tape manager is to configure the virtual tape virtual PHY to allow access to the disk drives of the virtual tape virtual PHY for virtual tape functions and prevent other devices from accessing the disk drives for other purposes.

6. The SAS expander of claim 1, wherein the particular zone group is a first zone group.

7. The SAS expander of claim 6, wherein the virtual tape manager is configured to define a second zone group for another physical drive bay associated with one of the disk drives to allow an initiator unlimited access to storage resources associated with the another physical drive bay.

8. The SAS expander of claim 1, wherein the received command includes a list of physical PHYs corresponding to the identified physical drive bays.

9. The SAS expander of claim 1, wherein the defining of the particular zone group by the virtual tape manager is responsive to a request from a user interface.

10. A method of using a serial attached small computer system interface (SAS) expander to provide a virtual tape drive, the method comprising:
    receiving from another SAS expander a SAS command to identify drive bays to generate a virtual tape virtual PHY;
    generating the virtual tape virtual PHY capable of being part of a zone group, wherein the virtual tape virtual PHY comprises the identified drive bays;
    defining a first zone group for a physical drive bay associated with a disk drive to prevent an initiator from targeting the disk drive associated with the physical drive bay so that the initiator does not have direct access to the disk drive associated with the physical drive bay and only has access to the virtual tape drive associated with the physical drive bay, the first zone group assigned to the initiator for the virtual tape drive; and
    generating, in response to the defining of the first zone group assigned to the initiator for the virtual tape drive, a BROADCAST primitive sent to the initiator to allow the initiator to discover the virtual tape drive.

11. The method of claim 10, further comprising receiving from the initiator sequential access commands for the virtual tape drive, and converting the sequential access commands for the virtual tape drive to random access commands for a disk drive.

12. The method of claim 10, further comprising generating a BROADCAST primitive sent to a second expander to allow update of routing tables of the second expander.

13. The method of claim 10, further comprising receiving a SAS command to zone the virtual tape virtual PHY.

14. The method of claim 10, further comprising communicating to another expander information relating to the generated virtual tape virtual PHY.

15. The method of claim 10, further comprising associating disk drives of the drive bays for emulation of tape drives.

16. The method of claim 10, wherein defining the first zone group for the physical drive bay comprises defining the first zone group for the physical drive bay that is included in the virtual tape virtual PHY.

17. The method of claim 10, wherein receiving the command comprises receiving the command responsive to user selection of drive bays in a user interface, and wherein defining the first zone group is responsive to user input in the user interface.

18. The method of claim 10, further comprising:
    defining a second zone group for another physical drive bay associated with a given disk drive to allow another initiator unlimited access to storage resources associated with the another physical drive bay.

19. A non-transitory computer computer-readable medium having computer executable instructions stored thereon for using a serial attached small computer system interface (SAS) expander, the instructions are executable by at least one processor to:
    receive from another SAS expander a SAS command to identify physical drive bays to generate a virtual tape virtual PHY;
    generate the virtual tape virtual PHY capable of being part of a zone group, wherein the virtual tape virtual PHY comprises the identified physical drive bays;
    define a particular zone group for a particular physical drive bay associated with a given disk drive to prevent an initiator from targeting the given disk drive associated with the particular physical drive bay so that the initiator does not have direct access to the given disk drive associated with the particular physical drive bay and only has access to a virtual tape drive associated with the particular physical drive bay, the particular physical drive bay associated with the virtual tape virtual PHY, and the particular zone group assigned for the virtual tape drive and assigned to the initiator; and in response to the defining of the particular zone group, generate a BROADCAST primitive sent to the initiator to allow the initiator to discover the virtual tape drive.

20. The computer readable medium of claim 19, further comprising instructions that upon execution cause the at least one processor to:

receive from another expander sequential access commands for the virtual tape drive, and convert the sequential access commands for the virtual tape drive to random access commands for a disk drive.

21. The computer readable medium of claim 19, further comprising instructions that upon execution cause the at least one processor to:

generate a BROADCAST primitive sent to a second expander to allow update of routing tables of the second expander.

22. The computer readable medium of claim 19 further comprising instructions that upon execution cause the at least one processor to:

communicate to another expander information relating to the generated virtual tape virtual PHY.

23. The computer readable medium of claim 19, wherein the instructions upon execution cause the at least one processor to:

define a second zone group for another physical drive bay associated with a disk drive to allow another initiator unlimited access to storage resources associated with the another physical drive bay.

* * * * *